US011989601B1

(12) United States Patent
Bhatt et al.

(10) Patent No.: US 11,989,601 B1
(45) Date of Patent: May 21, 2024

(54) METHODS AND PRINTING SYSTEM USING A FAILOVER RASTER IMAGE PROCESSORS

(71) Applicant: Kyocera Document Solutions Inc., Osaka (JP)

(72) Inventors: Jayant Bhatt, Torrance, CA (US); Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/126,606

(22) Filed: Mar. 27, 2023

(51) Int. Cl.
*G06K 15/00* (2006.01)
*G06K 15/02* (2006.01)

(52) U.S. Cl.
CPC ....... *G06K 15/408* (2013.01); *G06K 15/1825* (2013.01); *G06K 15/1836* (2013.01); *G06K 15/1894* (2013.01)

(58) Field of Classification Search
None
See application file for complete search history.

(56) References Cited

U.S. PATENT DOCUMENTS

| | | |
|---|---|---|
| 6,816,276 B2 | 11/2004 | Sugano |
| 7,262,876 B2 | 8/2007 | Wei et al. |
| 8,693,016 B2 | 4/2014 | Ward et al. |
| 11,076,055 B2 * | 7/2021 | Kimura ................ H04N 1/0001 |
| 2004/0196493 A1 * | 10/2004 | Christiansen ......... G06F 3/1285 358/1.15 |
| 2004/0243934 A1 * | 12/2004 | Wood .................... G06F 40/106 715/234 |
| 2007/0057978 A1 * | 3/2007 | Hagiwara .......... G06K 15/1822 347/5 |
| 2009/0080025 A1 * | 3/2009 | Aronshtam .......... G06F 3/1248 358/1.17 |
| 2013/0010325 A1 * | 1/2013 | Varga ................. G06K 15/1857 358/1.15 |
| 2013/0016380 A1 * | 1/2013 | Johnson ............. G06K 15/1886 358/1.15 |
| 2013/0021623 A1 * | 1/2013 | Ward ................. G06K 15/1856 358/1.9 |
| 2013/0335763 A1 * | 12/2013 | Mizutani ............... G06F 3/1298 358/1.13 |
| 2016/0275386 A1 * | 9/2016 | Aoki .................... G06F 3/1247 |

* cited by examiner

*Primary Examiner* — Henok Shiferaw
(74) *Attorney, Agent, or Firm* — Millen, White, Zelano & Branigan P.C.; William F. Nixon

(57) ABSTRACT

A printing system includes a printing device. The printing device includes a raster image processor (RIP) system that renders pages of a print job for printing. The RIP system processes pages of the print job in parallel. It also processes job is parallel. If an error occurs when processing a page using a standard RIP, then the RIP system activates a failover RIP. The failover RIP uses a different strategy for processing the page than a standard RIP. The failover RIP is configured to implement the strategy. A failover queue is used to store error pages to wait for processing by the failover queue. The processed page is outputted from the failover RIP to a front end of the RIP system.

21 Claims, 13 Drawing Sheets

METHODS AND PRINTING SYSTEM USING A FAILOVER RASTER IMAGE PROCESSORS

FIELD OF THE INVENTION

The present invention relates to a printing system and associated methods to process jobs using raster image processors (RIPs) in a RIP system configured for optimal processing. More particularly, the present invention uses a failover RIP to improve processing on print jobs within the printing system.

DESCRIPTION OF THE RELATED ART

Conventional raster image processors (RIPs) may have many major components. A RIP includes an interpreter that parses specific page description languages (PDLs), such as postscript or portable document format (PDF). The RIP also includes a drawing unit that converts a drawing command into a metadata that can be consumed by a renderer. The drawing unit may contain a font rasterizer that converts text into bitmaps, a graphic services unit that converts images into a format recognized by the renderer, and drawing services that converts vector objects into metadata. The RIP also includes a renderer that generates raster output from the drawing metadata. The raster output from the renderer is sent to the imaging, or printing, device.

Implementation of RIPs usually is serial to process one page at a time. With the advent of production printing, a need arose to process pages faster compared to serial processing. Thus, production printing systems may implement parallel processing depending on the granularity of the work. Multiple jobs may be processes in parallel, pages of a job may be processed in parallel, or drawings of a page may be processed in parallel. The RIP configuration, whether processing jobs or pages in parallel, is implemented so all RIP instances are configured in the same manner. This aspect ensures uniform job processing as all RIP instances use equivalent system resources.

When an error occurs in printing a job, the process will fail, continue to print, or display an error message. The processing will stop. Thus, time and resources may be lost.

SUMMARY OF THE INVENTION

A method for resolving an error during printing operations is disclosed. The method includes detecting an error in processing a page of a print job by a first raster image processor (RIP) of a RIP system. The method also includes activating a failover RIP by a front end of the RIP system. The method also includes processing the page at the failover RIP. The failover RIP is configured to process the page using a different strategy than the first RIP. The method also includes processing a next page of the print job at the first RIP. The method also includes outputting the processed page from the failover RIP to the front end.

A method for managing printing operations is disclosed. The method includes detecting an error in processing a page of a print job by a first raster image processor (RIP) of a RIP system. The method also includes determining whether a failover RIP is active within the RIP system. The method also includes, if the failover RIP is not active, configuring the failover RIP by a front end of the RIP system and pushing the page to the failover RIP. The method also includes, if the failover RIP is active, placing the page in a failover queue. The failover RIP pulls the page from the failover queue. The method also includes processing the page at the failover RIP. The method also includes determining that the failover RIP cannot render the page. The method also includes reconfiguring the failover RIP by the front end. The method also includes outputting the processed page from the failover RIP to the front end.

A method for managing printing operations is disclosed. The method includes detecting an error in processing a page of a print job by a first raster image processor (RIP) of a RIP system. The method also includes assigning the page to a failover RIP within the RIP system. The method also includes partitioning the page into a plurality of bands. Each of the plurality of bands having a first band size. The method also includes processing each of the plurality of bands for the page at the failover RIP. The method also includes generating output for the page by the failover RIP. The method also includes forwarding the output to a front end of the RIP system.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
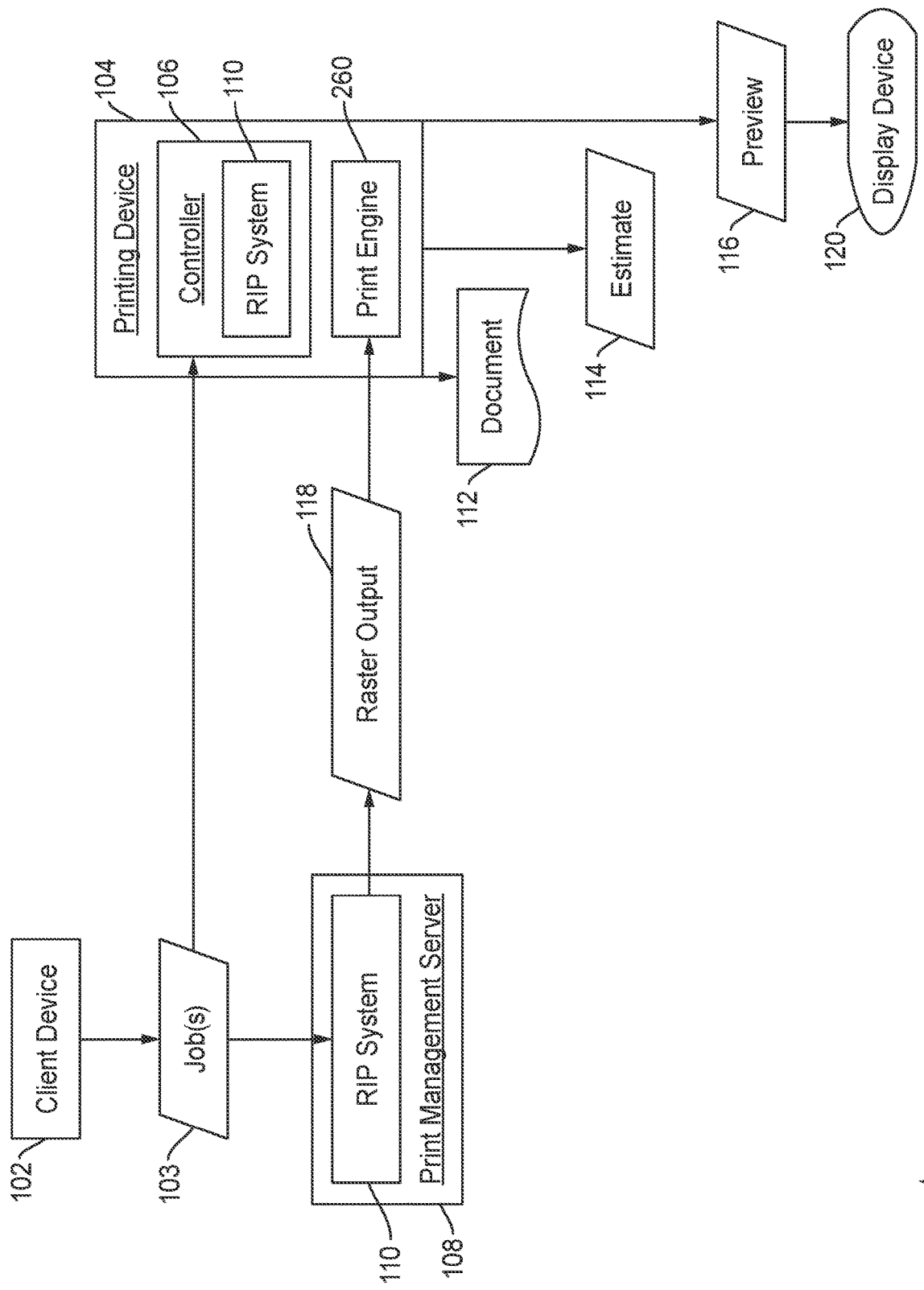
FIG. 1 illustrates a printing system for managing jobs according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments implement a failover RIP in the digital front end, or controller, to improve job processing resiliency. The failover, or resilient, RIP may be one of a plurality of RIPs in a RIP system in a printing system that renders pages that could not be processed otherwise using a standard RIP. A page may fail to render in the standard RIP due to a variety of reasons, such as lack of memory, missing resources like special fonts, and the like. The failover RIP ensures that a page can render using less memory and using additional resources.

The following discussion discloses the working of a failover RIP. While rendering a page, a standard RIP encounters an error. This error is propagated to the front end of the RIP system, which includes a plurality of RIPs. The front end determines the kind of error. It also determines if the first page having an error for the job. If it is the first error page of the job, then the failover RIP is activated. The first error page is pushed to the failover RIP. Alternatively, the failover RIP may be spawned whenever needed and the error page pushed to it.

If the failover RIP already is active, then the error page is queued for the failover RIP to process after it is done processing the previous error page. The standard RIP that reported the error page continues processing the next available page, while the failover RIP is processing the error page. The failover RIP will pull another page from the queue after it is done with the current error page. The job is finished if there are no more pages to process by the standard RIPs, as well as the failover RIP. If the failover RIP is active, then the RIP system will deactivate it. The job is cancelled if an error is encountered during processing of the error page by the failover RIP.

The disclosed embodiments, therefore, evaluate the error condition and determine whether the job may complete processing using a differently-configured RIP instance. The RIP system launches a failover RIP with one or more configuration changes aimed at providing the resources needed to render a page. For example, the failover RIP may be configured with additional memory. The RIP system may additionally shut down other RIP instances to ensure there is enough memory in the DFE to support a failover RIP instance with a higher memory allocation. The failover RIP may be configured with a smaller number of parallel renderers. The failover RIP also may be configured to output bands for later assembly before printing as opposed to rendering the whole page. Further, the band size itself may be reduced to further reduce memory requirements for rendering the job. Failover RIPs also may reduce the resolution of image objects.

When a page first fails to render, the RIP system may launch a failover RIP with less aggressive configuration changes in order to be as performant as possible. If the page still fails to render the page a second time, the RIP system may launch a more aggressively reconfigured failover RIP. Additionally, the RIP system may partially render the job in order to minimize resource requirements. The RIP system may render a subset of pages, relaunch the failover RIP, and render an additional subset of pages. The RIP system may repeat the above until the entire document is rendered.

The disclosed embodiments would improve the resiliency of DFE job processing. This feature would not only eliminate errors but help improve productivity as prepress operators would not have to spend time figuring out how to fix problematic print jobs. The DFE would do this automatically. This feature dovetails with both the need for more efficient production as run lengths continue to decrease and the number of jobs keeps increasing as well as the difficulty in hiring and retaining skilled staff.

FIG. 1 depicts a printing system 100 for managing jobs using RIP system 110 according to the disclosed embodiments. Printing system 100 may be located in a print shop or other environment suitable for production printing operations. Printing system 100 includes one or more printing devices 104 that receive jobs 103 from one or more client terminals 102.

Printing device 104 receives jobs through printing system 100, such as job 103. In some embodiments, job 103 is a print job. After processing job 103, printing device 104 may print or produce document 112 in a paper or media specified by the print job. Printing device 104 is disclosed in greater detail in FIG. 2. Printing device 104 also includes a controller, or digital front end (DFE), 106, which facilitates processing job 103. Controller 106 also includes RIP system 110, which is disclosed in greater detail below.

For example, controller 106 may use RIP system 110 to convert bitmap images, vector graphics, fonts, and the like associated with pages in job 103 to bitmap/rasterized representations of the pages, such as C, M, Y, and K pixels. The sum of the values of pixels of a particular color in the rasterized pages may be proportional to the amount of consumables used by printing device 104 to print that color. RIP system 110 may rasterize pages of job 103 according to various image rasterization settings. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters that can control the operation of printing device 104. For example, these settings may include printing device maintenance settings that control or effect head cleaning intervals, head clogging prevention intervals, and the like of printing device 104. Print engine 260 receives raster output from RIP system 110 in printing device 104 to print document 112 based on job 103.

Printing system 100 receives job 103 and may route it directly to printing device 104. Alternatively, printing system 100 may route job 103 to print management server 108. Print management server 108 may seek to offload processing of job 103 from controller 106 of printing device 104. This feature may be desirable if controller 106 does not have the processing capacity to handle jobs 103 in a production printing environment. Thus, print management server 108 also may include RIP system 110 that can provide raster output 118 directly to print engine 260 of printing device 104. These embodiments allow controller 106 to offload processing in order to handle other operations. Further, updates to RIP system 110 may occur at print management server 108 prior to any updates to RIP system 110 in printing device 104.

Job 103 is not always a print job that produces document 112. In some embodiments, job 103 may be an estimation job or a preview job. RIP system 110 determines which type of job is job 103 and configures itself accordingly. For an estimation job, RIP system 110 configures RIPs to process job 103 without impacting print processing within controller 106. The estimation RIPs process job 103 to provide an ink or toner estimate 114. Estimate 114 may be provided to an operator without engaging print engine 260.

For a preview job, RIP system 110 configures RIPs to process job 103 to quickly generate a lower resolution output as preview 116. Preview 116 may be a lower resolution output as compared to document 112 and estimate 114. Preview 116 is provided to the operator to review. Preview 116 may be provided to display device 120 for the operator to review and interact with using an interface. Display device 120 may be a separate device from client device 102 and printing device 104. In other embodiments, display device 120 may be incorporated within client device 102 or printing device 104.

As disclosed above, RIP system 110 may be a smart system that enables optimal processing by using parallel processing to handle a variety of jobs 103. Different jobs received at printing device 104 or print management server 108 result in different output, such as document 112, estimate 114, or preview 116. The RIP instances within RIP system 110 are configured according to the type of job 103 is received.

Figure 2:
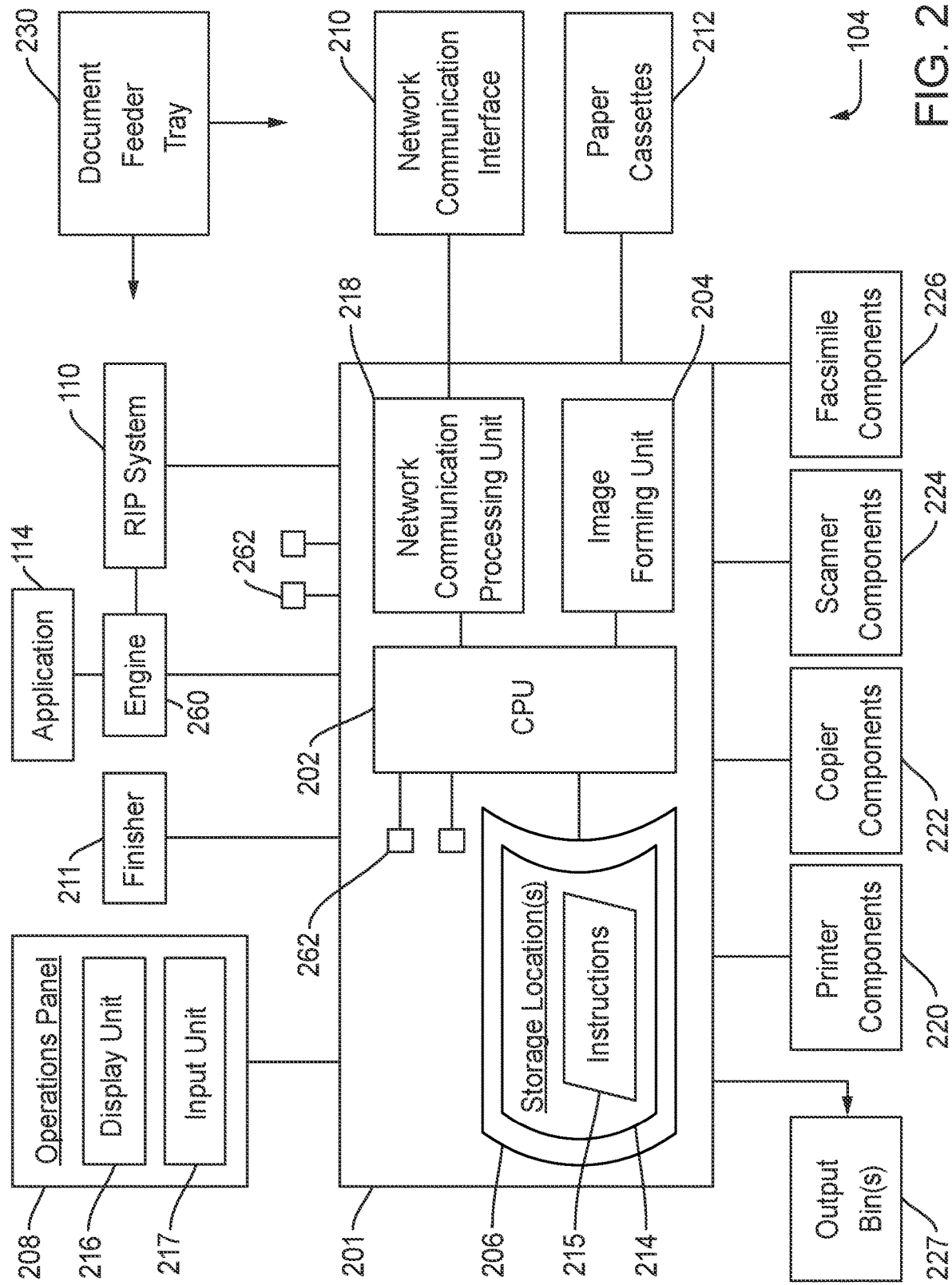
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within printing system 100. As disclosed above, printing device 104 may send and receive data from client device 102, print management server 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at controller 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from print management server 108. Display unit 216 may act as display device 120 for displaying preview 116 after it is generated by RIP system 110.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. RIP system 100 that interprets the page description languages (PDLs) would transmit and send instructions down to the lower-level engine 260 for actual rendering of an image and application of the ink onto paper during operations on printing device 104. RIP system 110 may be located in DFE 106, as disclosed above. Alternatively, RIP system 110 may be located on print management server 108 and directly communicates with print engine 260.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 102 and print management server 108 as well as other printing devices within printing system 100.

Figure 3:
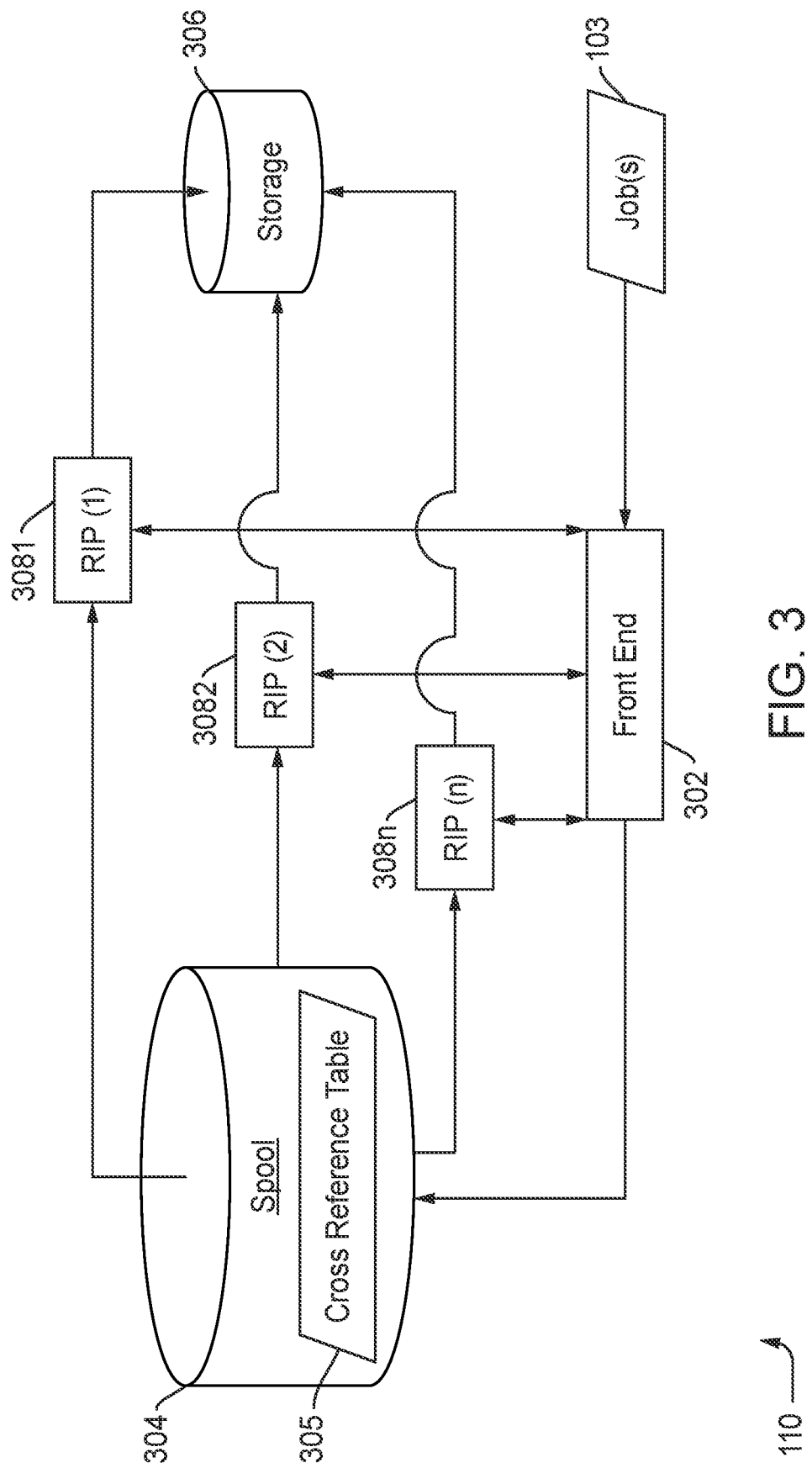
FIG. 3 illustrates a block diagram of a RIP system for use in processing a job in the printing system according to the disclosed embodiments.

FIG. 3 depicts a block diagram of RIP system 110 for use in processing job 103 in printing system 100 according to the disclosed embodiments. As disclosed above, RIP system 110 may be located in controller 106 of printing device 104. It also may be located on print management server 108 such that it communicates directly with print engine 260 of printing device 104.

RIP system 100 include front end 302 and RIP instances RIP 3081, RIP 3082, and RIP 308n. A RIP instance may be a RIP configured by front end 302 to process job 103. A RIP instance may be a standard RIP, a high performance RIP, a very high performance RIP, a preview RIP, an estimation RIP, or a failover RIP. All RIP instances and front end 302 operate in parallel to each other.

Front end 302 performs a variety of operations. It may contain multiple subunits that operate in parallel to perform the variety of operations, like spooling job 103, managing job 103, managing pages or segments of job 103, managing RIP instances 3081, 3082, and 308n, managing drives, determining the PDL type of job 103, distributing pages of segments of job 103 to the RIP instances, serializing pages or segments of job 103, sending notifications within printing device 104 or print management server 108.

Front end 302 may receive job 103 through printing system 100. Job 103 may be received from client device 102 via internet protocols within printing system 100. Job 103 may be spooled by front end 302 and stored in spool drive 304. Spool drive 304 may be a configurable drive. Front end 302 determines the PDL type of job 103. It then creates a cross reference table 305 in spool drive 304, which acts as a shared memory with RIP instances 3081, 3082, and 308n. Front end 302 also may create print ticket information in spool drive 304.

Front end 302 analyzes job 103 to determine which type of job it is. It uses this information to determine the number of RIPs and type of RIPs to be used in processing job 103. These features are disclosed in greater detail below. Depending on the type of job, front end 302 configures RIP instances 3081, 3082, and 308n. A configuration operation may create a RIP having a certain number of renderers. For example, RIP instance 3081 may be a standard RIP having a normal number of renderers, such as 4. RIP instance 3082 may be a high performance RIP that has a higher number of renders, such as 6. Front end 302 configures the RIP instances accordingly to process job 103.

Front end 302 then distributes pages or segments of job 103 to RIP instances 3081, 3082, and 308n. Job 103 may be a print job that is split into segments or pages for parallel processing. As RIP instance 3082 is a high performance RIP, then it may receive specific pages or segments of job 103. Pages may refer to one or more pages of job 103. Segments of job 103 also may refer to a number of pages or a block of data within job 103. The pages or segments are distributed by front end 302 using inter-process communication.

RIP instances 3081, 3082, and 308n may read cross reference table 305 along with print ticket information and the spooled data for job 103. Each RIP instance then processes the page or segment that it is instructed to by front end 302. The RIP instance may check cross reference table 305 to obtain any instructions in the print ticket information and the data for the page or segment in spool drive 304. RIP instances 3081, 3082, and 308n then parse the data for the page or segment to create metadata from the drawing commands.

The RIP instances render the metadata to storage 306. Storage 306 may store the rendered pages for a print job of job 103. The rendered pages may be stored according to a specific image format, such as the KYOCERA™ Image Format (KIF). The stored pages may then be provided to print engine 260 to print document 112. For jobs 103 that do not require printing, such as previews and estimates, the data generated by the RIP instances may be provided back to front end 302 for further operations.

RIP system 110 provides advantages over conventional RIP systems. Front end 302 may control the number of renderers per RIP. It may increase the number to process a page or segment faster. It also may increase the amount of memory allocated to the RIP as faster processing consumes more memory. If processing is to be slower, such as for estimate 114 or preview 116, then the configured RIP should consume less memory. Front end 302 manages these requirements through dynamic configuration of the RIPs based on the parameter of job 103.

In some instances, front end 302 may determine that job 103 is not able to be split into pages or segments for parallel processing. Thus, it may configure a RIP instance, such as RIP instance 308n, into a very high performance RIP. The very high performance RIP uses more renderers than the standard RIP and high performance RIP. For example, RIP instances 308n may be configured to use 8 renderers. This feature increases the processing speed of RIP instance 308n. Front end 302 may still use RIP instances 3081 and 3082 for parallel processing on one job 103 while using RIP instance 308n for processing another job 103 that is not able to be broken into pages or segments.

RIP system 110 provides features available due to the parallel processing using dynamically configured RIP instances. RIP system 110 may configure a high performance RIP to improve the first page out time. It also may use differently configured RIPs for different purposes, such a preview RIPs, estimation RIPs, and failover RIPs. RIP system 110 also may configure very high performance RIPs for jobs that cannot be processed in a page or segment parallel manner.

RIP system 110 also provides the ability to change the number of renderers per RIP. RIP system 110 also changes the number of RIP instances based on its workload, which includes shutting down certain types of RIPs in order to launch other types of RIPs. RIP system 100 also processes different kinds of jobs in RIPs with different configurations. RIP system 110 also uses different RIPs with different configurations for different purposes. It configures RIP instances with different imaging pipelines. RIP system 110 also retries failed jobs or job pages in a differently configured RIP instance.

Figure 4:
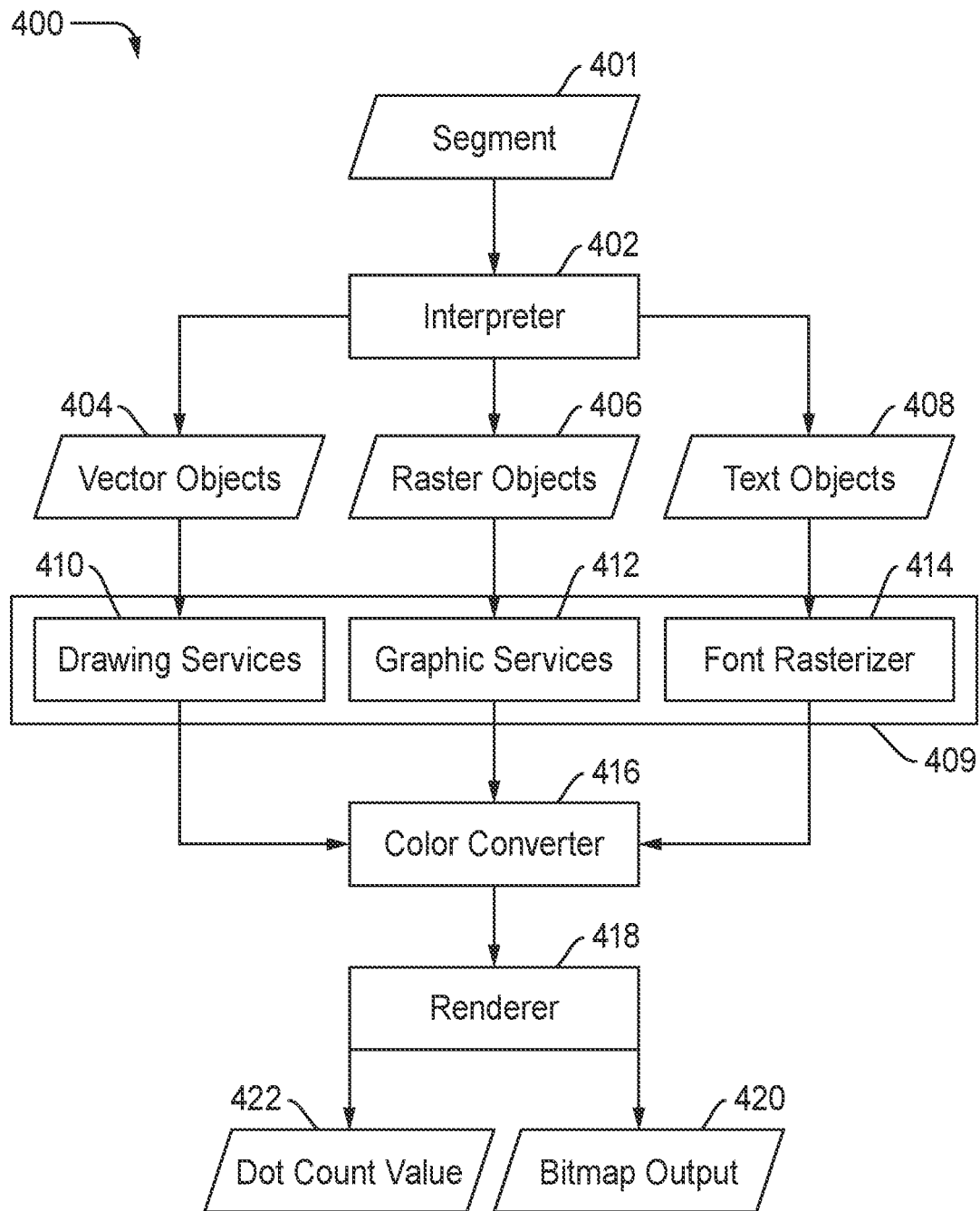
FIG. 4 illustrates a block diagram of an example RIP used within the RIP system according to the disclosed embodiments.

FIG. 4 depicts a block diagram of an example RIP 400 used within RIP system 110 according to the disclosed embodiments. RIP 400 may represent a configuration for RIP instances 3081, 3082, or 308n. RIP 400 may represent the hardware and software configuration used to determine what value each pixel output should possess, driven by commands from a page description language (PDL). RIP 400 converts a vector-based image, or a stored image, into a series of mathematical formulas that describe lines and curves into a pattern of spots needed to generate the output, or raster image. Interpreter 402 converts a job file into a display list, which is then converted into a bitmap output 420 describing a page of the document.

RIP 400 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP 400 may provide interpretation, rasterization, and screening.

Segment 401 may be a job file associated with job 103. Segment 401 may be provided to RIP 400 to convert its code into raster or bitmap code. As disclosed above, front end 302 receives job 103. Front end 302 may split job 103 into segments for parallel processing by the RIP instances. Preferably, segment 401 is a page the document in job 103. RIPs process pages in a parallel manner within RIP system 100. RIP 400 is one of the RIP instances. In other embodiments, segment 401 may be several pages, a graphic design, or other portion of job 103.

RIP 400 may break the page into a number of bands, such as 24. In other words, the page may be broken into 24 bands, each band having a number of lines. For example, the number of lines may be 128 lines.

Segment 401 is received at interpreter 402, which interprets the commands in the code to redraw the object and elements of a page as vector objects 404, raster objects 406, and text objects 408. Interpreter 402 parses specific PDLs into drawing commands. The PDL of segment 401 is read and decoded into graphical elements to be placed on a sheet. Each element may be an image, a character of text, a fill, stroke, and the like or listed in vector objects 404, raster objects 406, and text objects 408. In other words, there may be different kinds of data to be interpreted.

Vector objects 404 may relate to lines, circles, and the like within the data. Raster objects 406 may relate to images within the data. Text objects 408 may related to text or characters within the data. A page may include data related to all three types of objects, or only may relate to one type of object. The next part of the process depends on the type of object.

Drawing unit 409 receives vector objects 404, raster objects 406, and text objects 408 to convert the drawing commands into metadata that can be provided to renderer 418. Thus, drawing unit 409 converts vector objects 404 using drawing services 410. Drawing services 410 also may be referred to as printing device services. Drawing services 410 may process an object within segment 401 by scanning lines, curves, and the like within the object. A scan line table may be used in this process.

Drawing unit 409 also converts raster objects 406 using graphic services 412. Graphic services 412 may provide upscaling or downscaling and color convert an image object into components. For example, conversion by graphic services 412 for a grey image may result in one component, for an RGB image into three components, or for an CMYK image into four components. Graphic services 412 process the image or images for rendering, or into raster data.

Drawing unit 409 also converts text objects using font rasterizer 414. Font rasterizer 414 may process text and build bitmap data for segment 401. Font rasterizer 414 may check fonts and size of the characters and text. Font rasterizer 414 also may obtain a bitmap character and store it to be used again, which speeds up processing.

RIP 400 also may implement color converter 416. Color converter 416 may implement color conversion operations for the metadata generated by drawing unit 409. Color converter 416 provides color management and calibration. These actions may be applied during interpretation or rendering, depending on configuration and job content. Color printing resources may be accessed to provide the color management.

Renderer 418 processes the metadata from drawing unit 409 to convert every graphical element into the appropriate pattern of pixels to form the output raster. The resolution independent vector objects 404 as drawing services 410 are converted into pixels. Screening takes the raster image of pixels to form individually screened cyan, magenta, yellow, and black separations. These are halftone dots in the form of a bitmap output 420 consisting of commands that can be understood by print engine 260.

The disclosed embodiments also may determine dot count value 422 from the rendered image provided by renderer 418. Dot count values may be adjusted based on screening and based on settings at printing device 104. Dot count value 422 may be reported to determine estimate 114 for an estimation job, as disclosed below.

The rendered bitmap output 420 may be stored in storage 306 to be sent to print engine 260 when all the pages or segments of job 103 are processed. RIP 400 shows one path for rendering and providing output. Preferably, RIP 400 uses multiple rendering paths that use multiple renderers. The disclosed embodiments may use a renderer 418 for each channel in RIP 400, such as one each for cyan, magenta, yellow, and black. The number of renderers 418 may be configured by front end 302 depending on job 103. Each renderer 418 requires memory and processing resources. A high number of renderers 418 in RIP 400 will consume more memory but run faster. A lower number of renderers 418 in RIP 400 will consume less memory but run slower.

Figure 5:
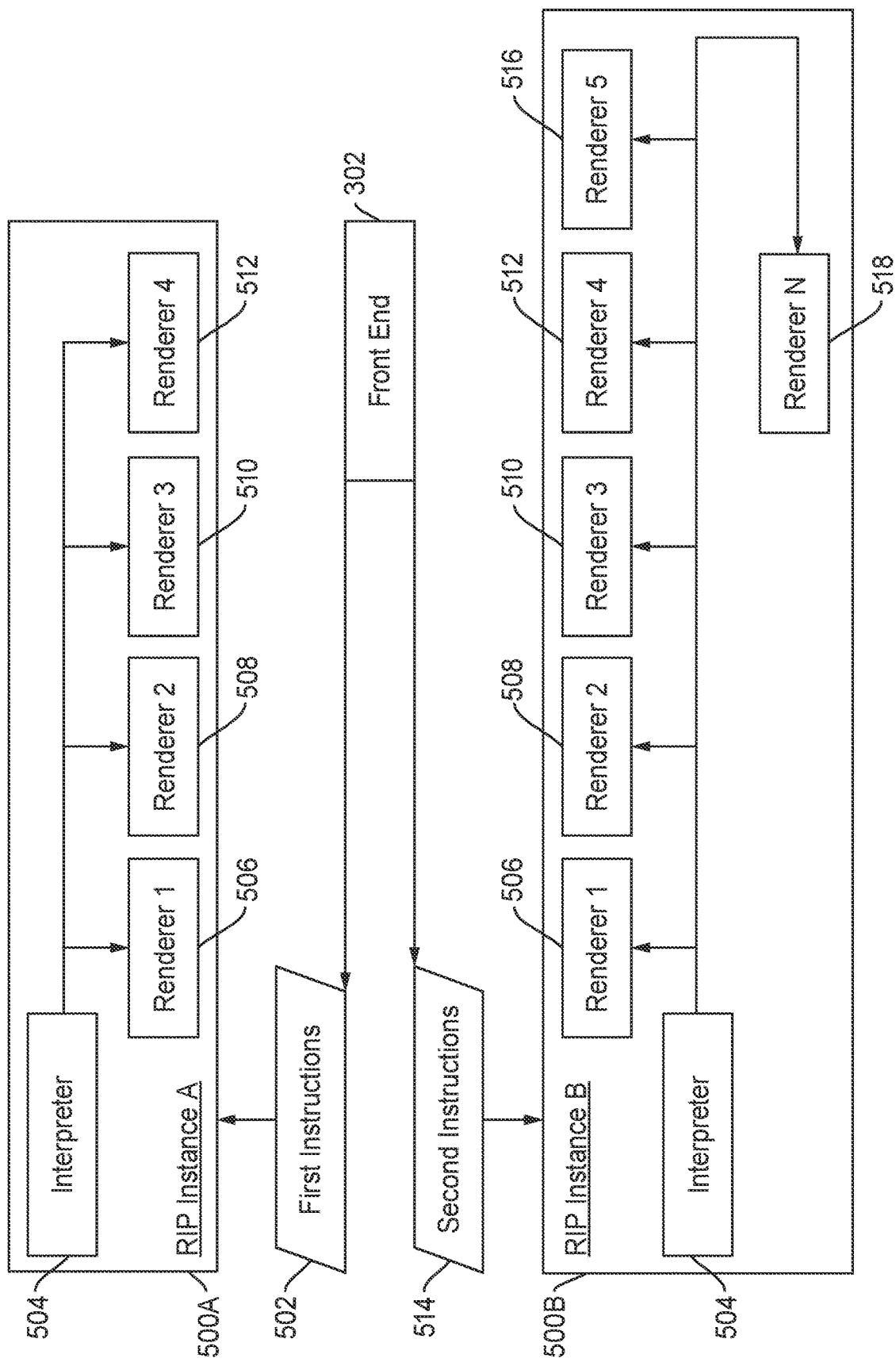
FIG. 5 illustrates a block diagram of a front end configuring a RIP instance according to the disclosed embodiments.

FIG. 5 depicts a block diagram of front end 302 configuring a RIP instance 500 according to the disclosed embodiments. Front end 302 may send instructions to RIP instance to change their configuration in response to a need for different RIPs within RIP system 110. These changes may include increasing the number of renderers within the RIP, decreasing the number of renderers within the RIP, changing the type for RIP, and the like. This feature enables RIP system 100 to be configurable to meet the processing requirements for different jobs.

Front end 302 may send first instruction 502 to RIP instance 500A. RIP instance 500A may correspond to RIP 400, as disclosed above. The features of RIP 400 are not repeated here for brevity. RIP instance 500A may be considered a standard RIP that includes interpreter 504 along with renderer 1 506, renderer 2 508, renderer 3 510, and renderer 4 512. Renderers 506-512 may operate to perform functions in processing a print job, providing a preview, or providing an estimate.

First instruction 502 may instruct RIP instance 500A to modify its configuration to meet a current need within RIP system 110. For example, front end 302 may determine that RIP instance 500A needs to reconfigure itself to be a high performance RIP. First instruction 502 includes instructions to increase the number of renderers within RIP instance 500A to become a high performance RIP. The disclosed embodiments execute instruction 502 to reconfigure RIP instance 500A.

After instruction 502 is completed, RIP instance 500B includes interpreter 504 along with an increased number of renderers. The increased number of renderers provide RIP instance 500B with increased processing capability but also takes up more memory and resources to accommodate the increased number of renderers. Thus, RIP instance 500B includes renderer 1 506, renderer 2 508, renderer 3 510, renderer 4 512, renderer 5 516, and renderer N 518. Renderer N 518 may be the last renderer implemented in RIP instance 500B. In some embodiments, renderer N 518 may be the sixth renderer. In other embodiments, renderer N 518 may be the eighth renderer such that renderers 6 and 7 also are included in RIP instance 500, but not shown. RIP instance 500B now includes two or more additional renderers to perform processing of a print job, page, segment, and the like.

Front end 302 may receive another job 103 that requires RIP instance to be reconfigured back to a standard RIP. Second instruction 514 is received at RIP instance 500B. Second instruction 514 is executed as a result to reconfigure RIP instance 500B back to four renderers. Processing capability may be reduced, but less memory and resources will be needed. Thus, front end 302 may dynamically configure the RIP instances to become different RIPs, as needed based on job requirements.

First instruction 502 also may instruct RIP instance 500A to modify its configuration to become a failover RIP. A failover RIP is disclosed in greater detail below. RIP instance 500B, therefore, may be configured to implement a different strategy that RIP instance 500A. For example, the number renders may be reduced to two. For example, only renderer 1 506 and renderer 2 508 may remain. Another strategy may be using less memory on the failover RIP, using additional resources like special fonts for segment 401 if the segment failed for missing fonts, processing segment 401 with less parallel processing components, using a reduced band size, and the like. RIP instance 500B as a failover RIP will differ from RIP instance 500A.

The disclosed embodiments may configure RIP instance 500A to include any number of renderers. The number of renderers depends on the processing capability needed for job 103. The more renderers, however, then the more memory and resources need to be allocated for the RIP instance. Thus, RIP system 110 may not want a large number of high performance or very high performance RIPs running all the time. Front end 302 dynamically configures RIP system 110 to meet the processing requirements for the received job, whether it is a print job, estimation job, or preview job.

Figure 6A:
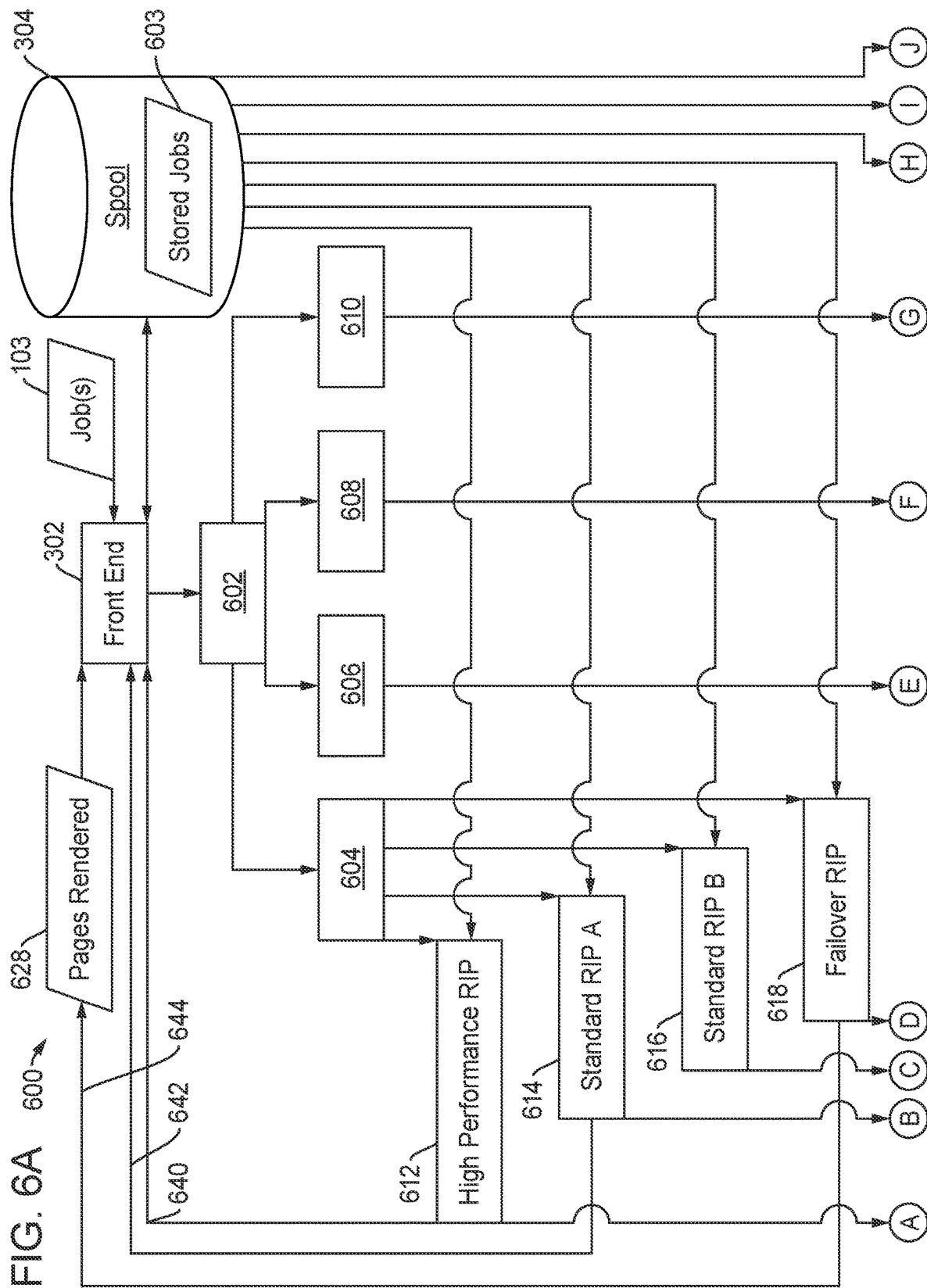
FIG. 6A illustrates a flow diagram for handling job flow within the RIP system according to the disclosed embodiments.
Figure 6B:
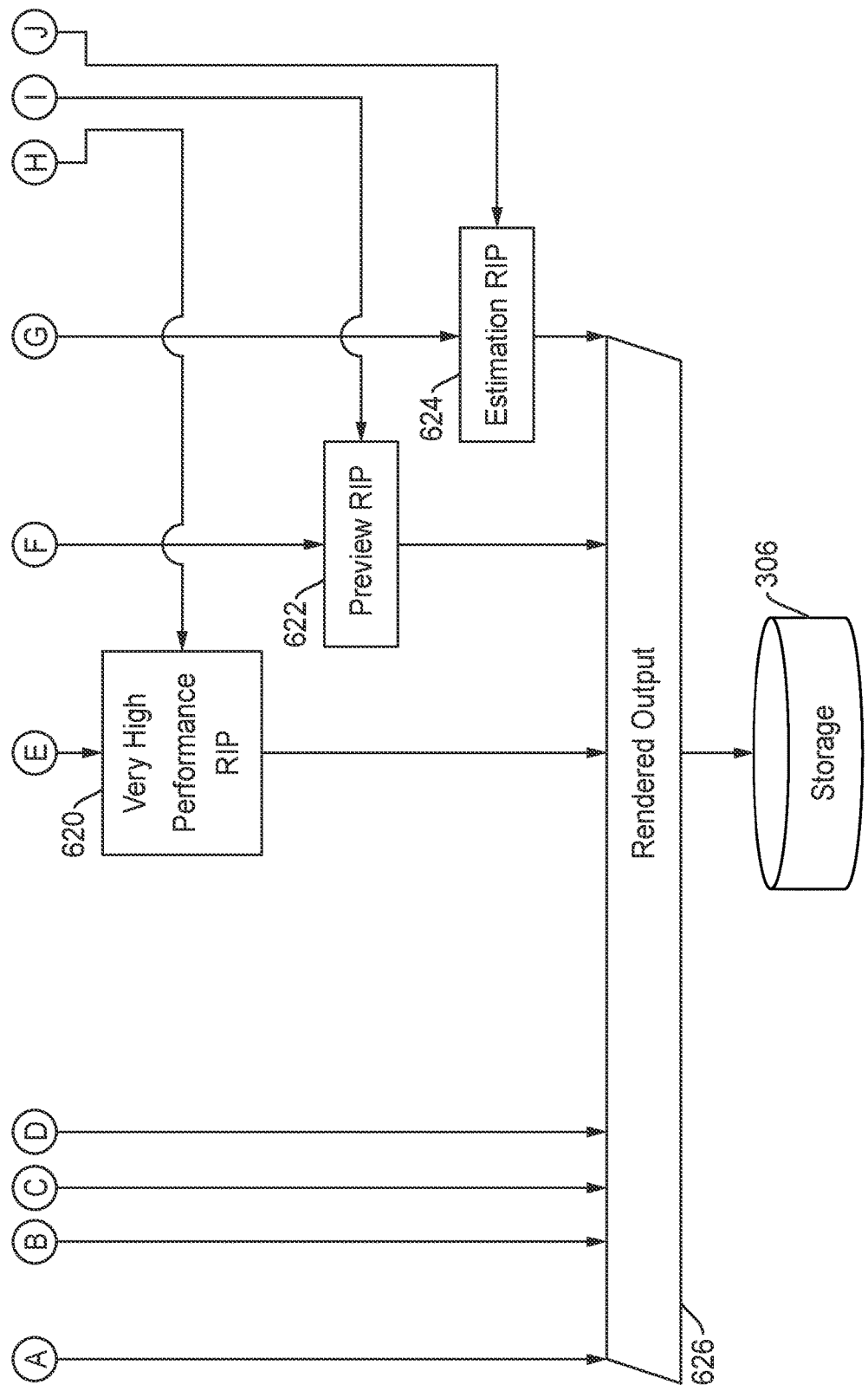
FIG. 6B further illustrates the flow diagram for handling job flow within the RIP system according to the disclosed embodiments.

FIGS. 6A and 6B depict a flow diagram 600 for handling job flow within RIP system 110 according to the disclosed embodiments. Flow diagram 600 may refer to FIGS. 1-5 for illustrative purposes. Flow diagram 600, however, is not limited to the embodiments disclosed by FIGS. 1-5.

Incoming jobs 103 are received at front end 302 of RIP system 110. Front end 302 executes operation 602 to determine the job type of each of the incoming jobs. Front end 302 also spools the data for each and stores the spooled data at spool drive 304 as stored jobs 603. Front end 302 treats the job within RIP system 110 according to the type of job.

For a print job, operation 604 executes by processing the print job in parallel. A certain number of standard RIPs will be configured as RIP instances. One RIP, however, will be configured as a high performance RIP to process the first page of the print job. Operations 604 sends the first page of the print job to high performance RIP 612. High performance RIP 612 includes additional resources, such as a higher number of renderers, to process the first page to be the first processed page available to front end 302 and to rendered output 626. As pages are placed in order within storage 306, the disclosed embodiments seek to have the first page rendered before the other pages.

Operation 604 also forwards each page, or segment, to RIPs to be processed in parallel so that print job can be rendered in a timely manner. Page 3 of the print job may be processed to standard RIP 614. Page x may be processed by standard RIP 616. While executing operation 604, RIP system 110 may determine that page 2 of the print job may not be processed by standard RIPs 614 and 616 or by high performance RIP 612. This situation may occur due to an out of memory error. Operation 604 sends page 2 to failover RIP 618 for processing. The process of using failover RIP 618 is disclosed in greater detail below.

While processing, high performance RIP 612 obtains the data for page 1 from spool drive 304. Cross reference table 305 may be used in obtaining the data. When complete, high performance RIP 612 sends a confirmation 640 to front end 302 that processing of page 1 is complete. The rendered output for page 1 is provided to rendered output 626. The same process may be used for standard RIPs doing the parallel processing. Standard RIP 614 obtains the data from spool drive 304 for page 3. When page 3 is rendered, confirmation 642 is sent to front end 302 to instruct it to provide another page or segment for processing using operation 604. The rendered output for page 3 is provided to rendered output 626. The standard RIPs may follow this process until the print job is complete.

Failover RIP 618 may receive an instruction from front end 302 via operation 604 to retrieve the data for page 2 from spool drive 304. Once complete, failover RIP 618 may provide pages rendered 628 to front end 302 while storing the rendered output for the pages in rendered output 626.

Referring back to operation 602, if a job 103 is a legacy, or non-Document Structuring Conventions (DSC), postscript job, then front end 302 may be not be able to break the job into pages or segments for parallel processing. Operations 606 executes by processing the print job using very high performance RIP 620. Very high performance RIP 620 may have large memory allocations, higher priority, and more parallel rendering threads than standard or high performance RIPs. Pages for the print job are provided to very high performance RIP 620 from spool drive 304. In some embodiments, operation 606 may be used to process a segment or page that requires additional processing. Once processing is complete, the rendered document for the print job is provided to rendered output 626. Very high performance RIP 620 also may confirm to front end 302 that it completed operation 606.

Referring back to operation 602, if a job 103 is a preview job, then operation 608 executes by using one or more preview RIPs 622 to process the job. Job 103 is not a print job in the sense that a document is printed at printing device 104. Instead, RIP system 110 generates a preview 116 that may be displayed on display device 120 for an operator to review. Front end 302 may configure a standard RIP into preview RIP 622. Operation 608 may instruct preview RIP 622 to process each page by retrieving the data from spool drive 304. The rendered output to use for preview 116 may be provided to rendered output 626.

Operation 602 may determine that a job 103 is an estimation job to generate estimate 114. Estimate 114 may be used to provide an ink or toner use estimate for printing job 103. The disclosed embodiments use information, such as dot count value 422, that is generated after rendering operations in making these estimates. Operation 610 executes by processing the estimation job using estimation RIP 624. Front end 302 may configure a standard RIP into estimation RIP 624. Operation 610 may instruct estimation RIP 624 to process each page by retrieving data from spool drive 304. The rendered output for estimate 114 is stored with rendered output 626.

RIP system 110 is capable of not only parallel processing a print job using a plurality of RIPs, it is capable of processing jobs in parallel. For example, job 1 is a print job that is processed using operation 604. Job 1 is processed by very high performance RIP 612 and standard RIPs 614 and 616 (operation 604 may use any number of high performance and standard RIPs). While job 1 is being processed, front end 302 determines that job 2 is a non-DSC postscript job that is to be processed at very high performance RIP 620. Very high performance RIP 620 is not impacted by the processing occurring at RIPs 612-616. RIPs 612-616 and 620 may process different jobs in parallel. This same feature also applies to job n–1, which is processed at preview RIP 622 using operation 608, and job n, which is processed at estimation RIP 624 using operation 610. In other words, operations 604, 606, 608, and 610 may execute in parallel.

Rendered output 626 may be stored in storage 306. Storage 306 provides the rendered jobs to print engine 260, if printing operations are needed. For estimates and previews, storage 306 may provide the rendered data to an estimation system or display device 120, respectively.

Figure 7:
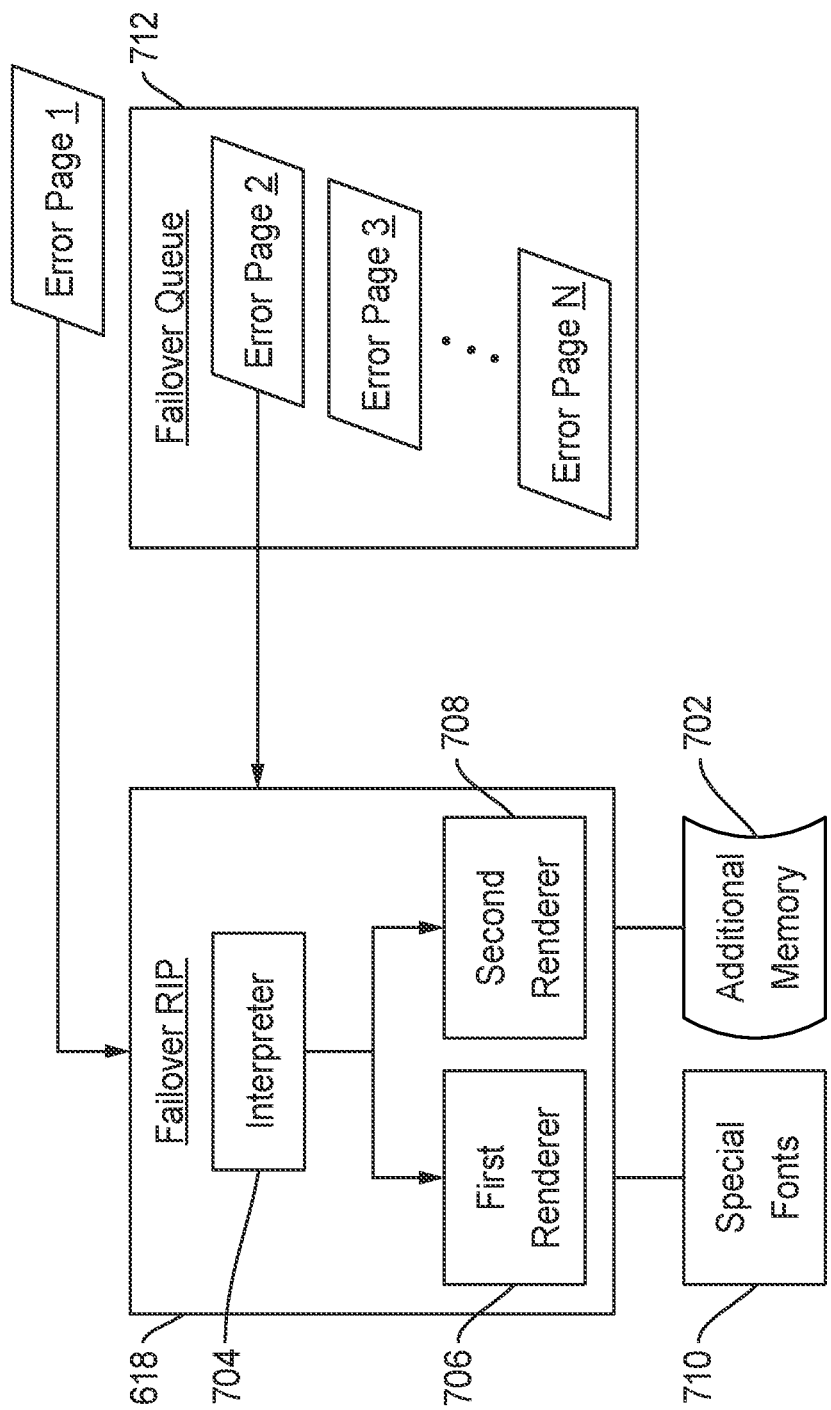
FIG. 7 illustrates a block diagram of a failover RIP within the RIP system according to the disclosed embodiments.

FIG. 7 depicts a block diagram of failover RIP 618 within RIP system 110 according to the disclosed embodiments. As disclosed above, front end 302 configures standard RIPs into RIP instances having different capabilities and functions. Front end 302 may configure a standard RIP into a failover RIP. RIP system 110 launches failover RIP 618 with one or more configuration changes aimed at providing the resources needed to render a page, or segment. In other words, the disclosed embodiments may implement multiple strategies to ensure that page, which failed on a standard RIP, is processed on failover RIP 618.

For example, failover RIP may be configured with additional memory 702. RIP system 110 may shutdown other RIP instances to ensure there is enough memory in controller 106 to support failover RIP 618 with a higher memory allocation. Referring back to FIG. 6, RIP system 110 may shutdown high performance RIP 612 or at least one of standard RIPs 614 and 616. The memory allocated for the shutdown RIP may be provided as additional memory 702.

Failover RIP 618 also may be configured with a smaller number of renders. As shown in FIG. 7, failover RIP 618 include interpreter 704 which includes two parallel processing paths to first renderer 706 and second renderer 708. The number of renderers in failover RIP 618 may be contrasted with the number of renderers in RIP 500A disclosed above. RIP 500A may include four renderers. First instructions 502 may be received from front end 302 to reconfigure standard RIP 500A into failover RIP 618. The reconfiguration reduces the number of renderers to two. The reduced number of renderers will use less memory for processing the page, which, in turn, will not cause problems with memory constraints.

In some embodiments, standard RIP 500A may be converted into failover RIP 618 without reducing the number of renderers. Failover RIP 618 includes renderers 506, 508, 510, and 512 from RIP 500A. This configuration may be a less aggressive configuration change. The less aggressive approach allows failover RIP 618 to process the page, or segment, as much as possible. If the page still fails to render, then RIP system 110 may further reconfigure failover RIP 618 to include first renderer 706 and second renderer 708, which uses less memory than renderers 506-512. If errors still occur, then failover RIP 618 may be further reconfigured with additional memory 702.

Failover RIP 618 may be configured to process the page, or segment, using a different strategy. These strategies may include processing the page, or segment, with less parallel components within failover RIP 618. This strategy may be found with the reduction of the number of renderers. Other parallel components also may be reduced. Another strategy may include using additional resources, such as special fonts 710. Special fonts 710 may provide replacements for missing fonts, which caused processing to fail. Another strategy may be using reduced band size in processing a page, which is disclosed in greater detail below.

Another option in implementing failover RIP 618 may include having the failover RIP partially render the page, or segment, in order to minimize resource requirements. RIP system 110 may render a subset of pages of job 103. RIP system 110 then relaunches failover RIP 618 and renders an additional subset of pages. RIP system 110 may repeat this process into the entire document is rendered.

In some embodiments, more than one failover RIP 618 may be launched. RIP system 110 may convert any number of standard RIPs into failover RIPs to handle error page processing. For example, RIP system 110 may include 16 standard RIP instances. Front end 302 may reconfigure one RIP instance into failover RIP 618 and shutdown another RIP instance to provide additional memory 702. If errors keep occurring, then RIP system 110 may reconfigure another standard RIP instance into a failover RIP and shutdown another standard RIP instance. Thus, RIP system 110 may be reconfigured to have 10 standard RIPs and 2 failover RIPs.

A failover RIP may remain dormant until an error, usually for a lack of memory resources, is encountered in a standard RIP. An error causes failover RIP 618 to become active. In some embodiments, failover RIP 618 may be spawned when needed using the reconfiguration process disclosed above. Because multiple pages are processed in parallel by standard RIPs, the page on which the error occurs first is sent to failover RIP 618. For example, page 1 has an error in its processing. Front end 302 may receive error page 1 from the standard RIP and pushes it to failover RIP 618.

Additional pages, or segments, from multiple standard RIPs are queued for processing by failover RIP 618. Thus, these pages are provided to failover queue 712. Failover queue 712 may be within failover RIP 618 or provided as a separate component within RIP system 110, or a separate component of front end 302. Failover queue 712 may be a separate component if there are more than one failover RIP in RIP system 110. In another embodiment, additional error pages from a standard RIP may be sent to multiple failover RIPs to render in parallel so that failover queue 712 provides these pages to the multiple failover RIPs.

Failover RIP 618 may use push and pull operations to render pages of job 103. The first error page, or error page 1 in FIG. 7, is pushed to failover RIP 618. The subsequent error pages from one or more standard RIPs are placed in failover queue 712. For example, N pages have errors in rendering one or more print jobs by RIP system 110. Because RIP system 110 can render multiple jobs in parallel, not all error pages are from the same job.

Failover queue 712 stores error page 2, which is received while failover RIP 618 is processing error page 1. It also may receive error page 3, and so on up to error page N, which may be the last received error page within RIP system 110.

When failover RIP 618 completes processing of error page 1, it pulls error page 2 from failover queue 712. If error page 2 is pulled by another failover RIP, then failover RIP 618 pulls error page 3. These operations may continue until error page N is finished processing. Afterwards, failover RIP 618 may go dormant or shutdown. Further, RIP system 110 may reconfigure failover RIP 618 back to a standard RIP.

The disclosed embodiments also processes the next page after error page 1 at the standard RIP that referred the error page. Thus, the standard RIP is not waiting for processing of error page 1 to be completed before commencing further operations. Referring to FIG. 6, standard RIP A 614 may note error page 1. Front end 302 pushes error page 1 to failover RIP 618. Standard RIP A 614 receives the next page of job 102 after error page 1 from spool drive 304. Standard RIP B 616 may report error page 2 while failover RIP 618 processes error page 1. Error page 2 is placed within failover queue 712.

If a standard RIP returns an error for a page, such as error page 1, then error page 1 is processed at failover RIP 618. If failover RIP 618, however, already returned an error for a previous page of the same print job, then the next error page is not processed at failover RIP 618. The job is cancelled. For example, failover RIP 618 may try to process a previous page of the job and is unable to do so without an error. Any subsequent error page will not be processed and the print job is cancelled to not tie up resources of RIP system 110.

Figure 8A:
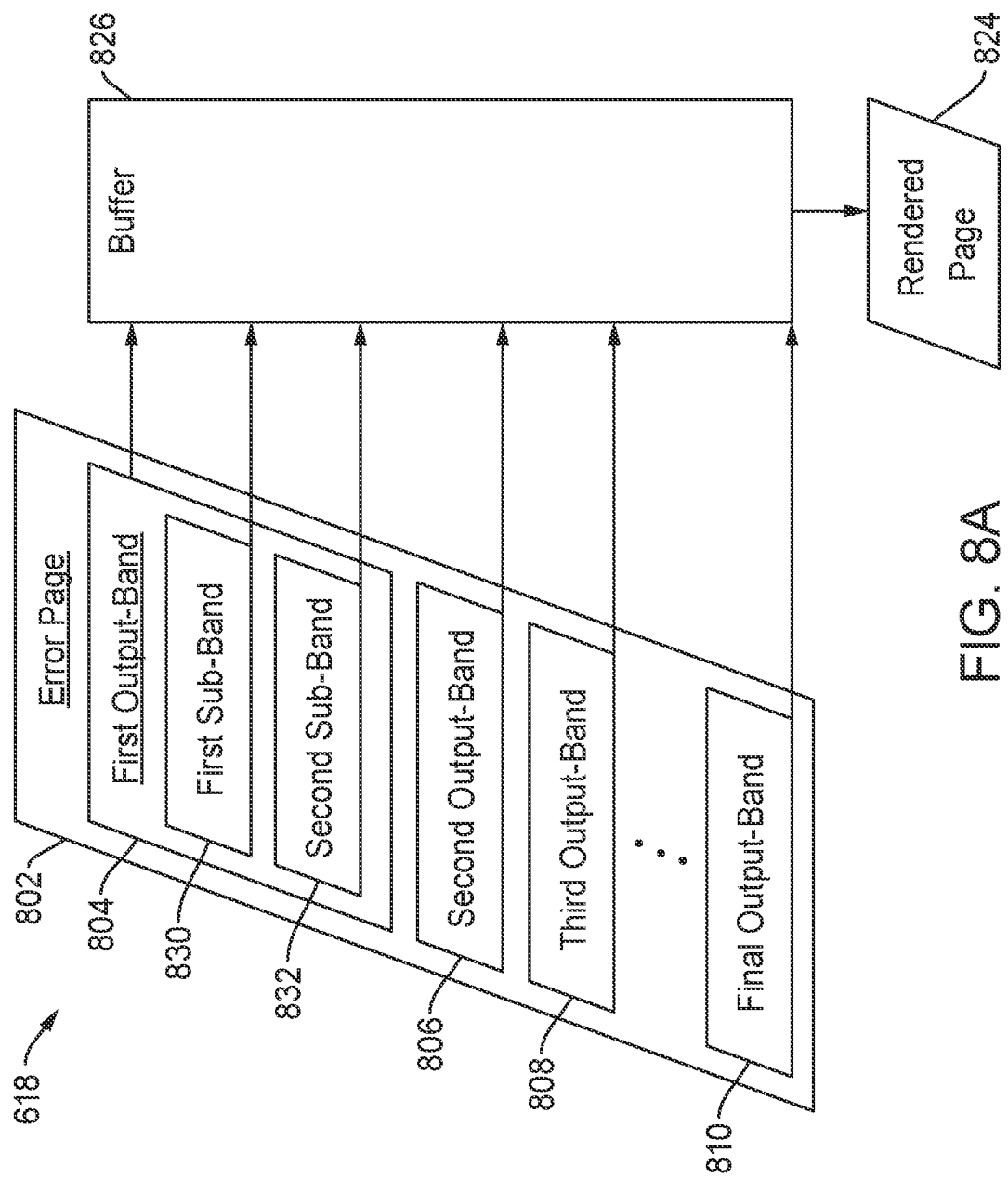
FIG. 8A illustrates a block diagram of a failover RIP processing an error page using output bands according to the disclosed embodiments.

FIG. 8A depicts a block diagram of failover RIP 618 processing an error page 802 using output bands according to the disclosed embodiments. Failover RIP 618 may be configured to use less memory by reducing the size of a band buffer, or output band. The band buffer may relate to the size of a buffer 826 to receive pages or segments to be processed at failover RIP 618. This feature enables failover RIP 618 to process error page 802 using less memory as compared to a standard RIP, or possibly a less aggressively configured failover RIP.

A standard RIP can render a full page of job 103, using the full memory allocated. Failover RIP 618 may process the page with lower the memory requirements for processing data within the page. Thus, RIP system 110 provides error page 802 to failover RIP 618, either by pushing the error page from front end 302 or by pulling the error page from failover queue 712. Failover RIP 618 may be configured to break error page 802 into output bands. In some embodiments, error page 802 is broken into 24 bands. This number may vary as needed.

The breaking of error page 802 into output bands is a feature inside failover RIP 618. Error page 802 may include first output band 804. First output band 804 may correspond to the top area of error page 802. Each band may include 128 lines of memory for data of error page 802. Thus, first output band 804 may be the top most data taking up 128 lines of memory from error page 802. The next 128 lines of memory may be allocated for second output band 806. Error page 802 is further broken into third output band 808 down to final output band 810, which may correspond to the bottom amount of data for 128 lines of memory from the error page. For processing, failover RIP 618 may break error page into these output bands.

Failover RIP 618 processes error page 802 based on the output bands. Failover RIP 618 may partition the data for error page 802 into the output bands with reduced size. Failover RIP 618 processes the data of the output bands. Because the output bands are subsets of data from error page 802, the resource requirements may be reduced within failover RIP 618 in processing the data. Failover RIP 618 may process each output band on its own until it finishes rendering final output band 810. Failover RIP 618 may compile the rendered data from the output bands to provide rendered page 824. RIP system 110 may take rendered page 824 and allocate it to the processes pages of job 103.

In an example, a vector object may take up enough lines to cover three output bands, such as output bands 804, 806, and 808. Failover RIP 618 may break the vector object into three parts, or convert into three output bands. Each of the three parts will take 128 lines of memory for processing. Thus, the disclosed embodiments may break large data instances, such as images, in error page 802 into smaller components to generate output bands for processing by failover RIP 618.

In some instances, 128 lines of memory may still be too big based on the limited resources available to failover RIP 618. In this case, RIP system, or front end 302, may configure failover RIP 618 to use dynamic band sizing. The lines of memory for an output band may be reduced to meet the memory resource requirements to process without a problem using failover RIP 618. For example, first output band 804 may be broken into first output sub-band 830 and second output sub-band 832. Output sub-bands 830 and 832 may use 64 lines of memory for data of error page 802.

Each output sub-band segment may include data for 64 lines of memory to be processed by failover RIP 618. To reduce the band size, RIP system 110 may relaunch failover RIP 618 with buffer 826 configured to use less memory or resources in process the reduced segments. If errors still persist, then failover RIP 618 may be relaunched with a lower output band size. Reduced output bands may be changed to include data, for example, corresponding to 32 lines of memory, or even 16 lines of memory.

Thus, the disclosed embodiments provide several different strategies to reduce the resources needed to process page using failover RIP 618. Failover RIP 618 is modified to operate within the parameters set forth by RIP system 110. As memory allocation decreases, RIP system 110 configures failover RIP 618 to stay within the allocation parameters.

Figure 8B:
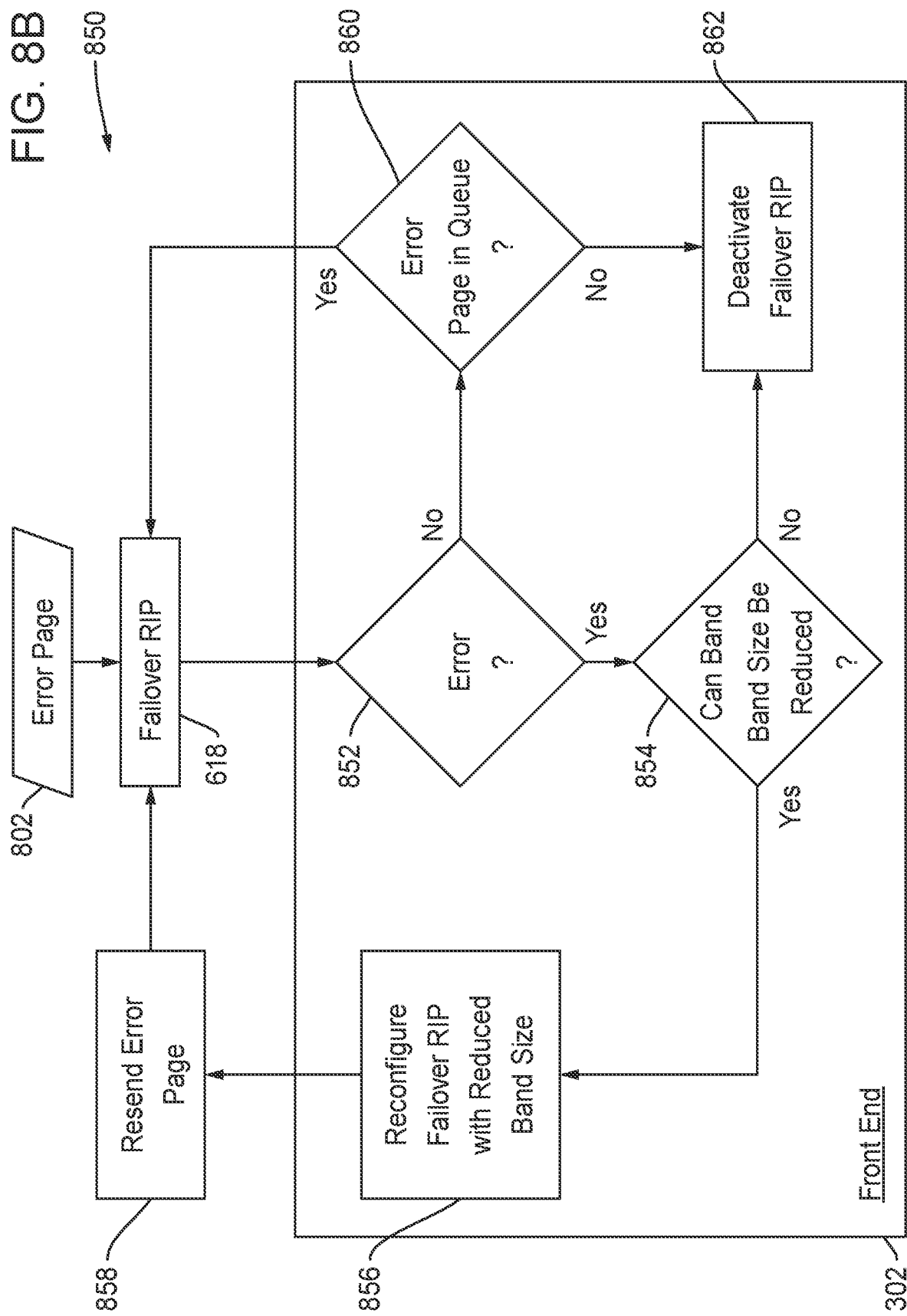
FIG. 8B illustrates a flow diagram for dynamically adjusting output band size within the failover RIP according to the disclosed embodiments.

FIG. 8B depicts a flow diagram 850 for dynamically adjusting output band size within failover RIP 618 according to the disclosed embodiments. Flow diagram 850 may refer to FIGS. 1-7 for illustrative purposes. Flow diagram 850, however, is not limited to the embodiments disclosed by FIGS. 1-7.

Error page 802 is provided to failover RIP 618. After processing, the result may be provided to front end 302. Operation 852 determines there is an error in processing error page 802. For example, failover RIP 618 may not have enough memory or resources to process error page 802. Alternatively, error page 802 may be broken into output bands within failover RIP 618, as disclosed above. The output band may still cause an error in processing within failover RIP 618.

If an error is detected, then flow diagram 850 proceeds to operation 854, which determines whether the output band size can be reduced. For example, the current output band size may be 128 lines of memory. Front end 302 may reduce the output band size to 64 lines of memory. If operation 854 is yes, then flow diagram 850 proceeds to operation 856. Operation 856 reconfigures failover RIP 618 with a reduced output band size. Failover RIP 618 may be relaunched. The size of buffer 826 may be reduced to accommodate the reduced output band size. Operation 858 resends error page 802 to failover RIP 618 to process again.

If operation 854 is no, then the output band sized cannot be reduced any further. For example, the output band size may be 16 lines of memory. Front end 302 will not reduce this size any further. Flow diagram 850 proceeds to operation 862. Operation 862 deactivates failover RIP 618 as it cannot process error page 802.

Referring back to operation 852, if no error is detected in the processing of error page 802 by failover RIP 618, then flow diagram 850 proceeds to operation 860. Operation 860 determines whether another error page is within failover queue 712. If yes, then flow diagram 850 returns to failover RIP 618 to pull the next error page from failover queue 712 to process. Operations 852-860 may be repeated. If operation 860 is no, then flow diagram 850 proceeds to operation 862, disclosed above.

Figure 9A:
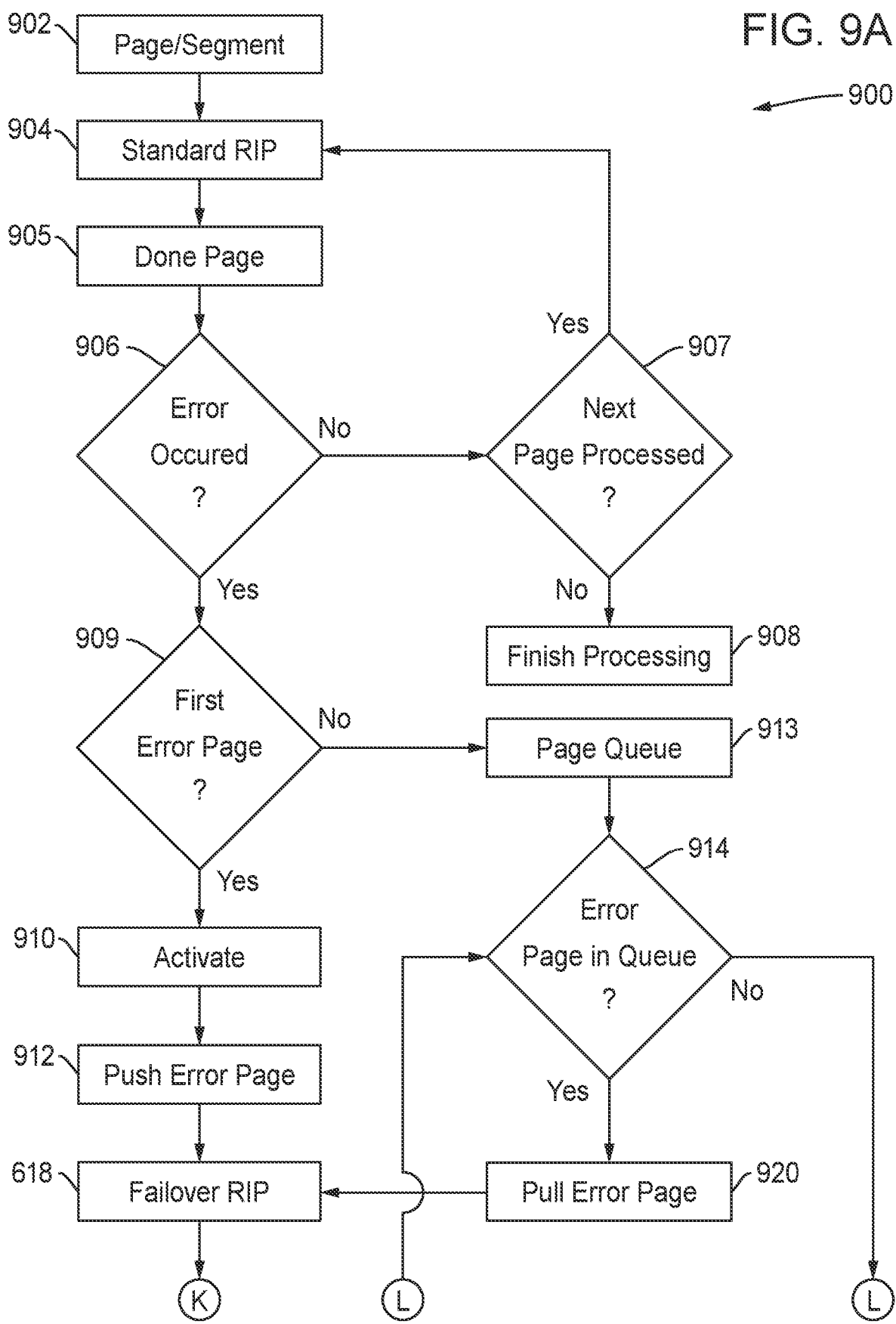
FIG. 9A illustrates a flow diagram for using the failover RIP within the RIP system according to the disclosed embodiments.
Figure 9B:
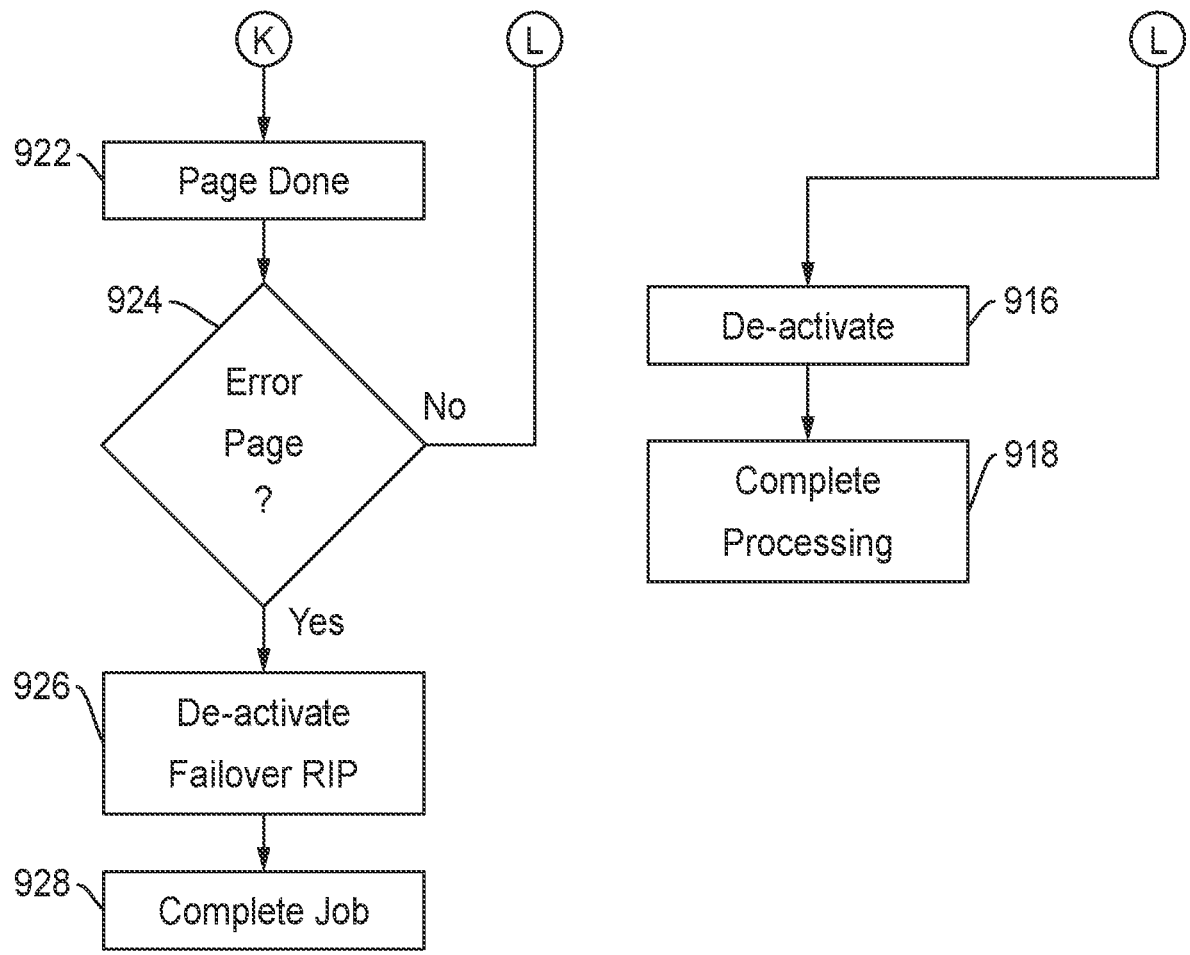
FIG. 9B further illustrates the flow diagram for using the failover RIP within the RIP system according to the disclosed embodiments.

FIGS. 9A and 9B depict a flow diagram 900 for using failover RIP 618 within RIP system 110 according to the disclosed embodiments. Flow diagram 900 may refer to FIGS. 1-8B for illustrative purposes. Flow diagram 900, however, is not limited to the embodiments disclosed by FIGS. 1-8.

Page or segment 902 is provided to standard RIP 904. Standard RIP 904 may correspond to the standard RIP instances disclosed above. For example, standard RIP 904 may include four renderers. Standard RIP 904 processes page 902 to render output for printing operations. Operation 905 provides the done page to be analyzed in operation 906 to determine if an error occurred while processing page 902. The done page may be corrupt if it cannot be rendered. One reason may be that standard RIP 904 cannot access the resources, such as memory, to process page 902.

If operation 906 is no, then page 902 has been processed without any problems. The done page may be provided to front end 302. Flow diagram 900 proceeds to operation 907. Operation 907 determines whether a next page needs to be processed from job 103, which included page 902. If yes, then flow diagram 900 proceeds to standard RIP 904 to receive another page of job 103. If operation 907 determine no further pages need to be rendered, then flow diagram 900 proceeds to operation 908, which finishes processing for job 103.

If operation 906 determines an error exists with the done page of page 902, then flow diagram 900 proceeds to operation 909. Operation 909 determines whether page 902 is the first error page detected for job 103. If yes, then flow diagram 900 proceeds to operation 910 to activate failover RIP 618. If failover RIP 618 not available, or not yet launched, then front end 302 may configure a standard RIP to become a failover RIP. Operation 912 pushes the error page to failover RIP 618. Failover RIP 618 may process the error page as disclosed above.

Referring back to operation 909, if the error page is not the first error page of job 103, then flow diagram 900 proceeds to operation 913. Operation 913 queues the error page in failover queue 712. The error page will reside in failover queue 712 until failover RIP 618 is available. It should be noted that if failover RIP 618 is idle when the error page is received, then it can be provided to failover RIP 618 without being placed in failover queue 712.

Operation 914 determines an error page resides in failover queue 712. If no page is within failover queue 712, then operation 916 deactivates failover RIP 618. Failover RIP 618 may be converted back to a standard RIP. Operation 918 executes by completing processing for job 103.

If operation 914 is yes, then the next page within failover queue 712 is retrieved. Operation 920 pulls the error page from failover queue 712 to failover RIP 618. Failover RIP 618 pulls the stored error pages from failover queue 712 until all are processed accordingly. Failover RIP 618 processed the pulled error page as disclosed above. Thus, all error pages are processed by failover RIP 618. Multiple failover RIPs may be configured to executes these operations. Operation 922 provides the done page after processing.

Operation 924 determines with the done page of operation 922 is an error page. In other words, despite the dynamic allocation actions, failover RIP 618 could not process page 902. If there is no error, then the done page is provided to front end 302 and flow diagram 900 returns to operation 914 to continue processing error pages within failover queue 712. If there is still an error, then operation 926 deactivates failover RIP 618. Operation 928 executes by completing job 103. In some instances, operation 928 may cancel processing of job 103. Controller 106 may return an error.

Figure 10:
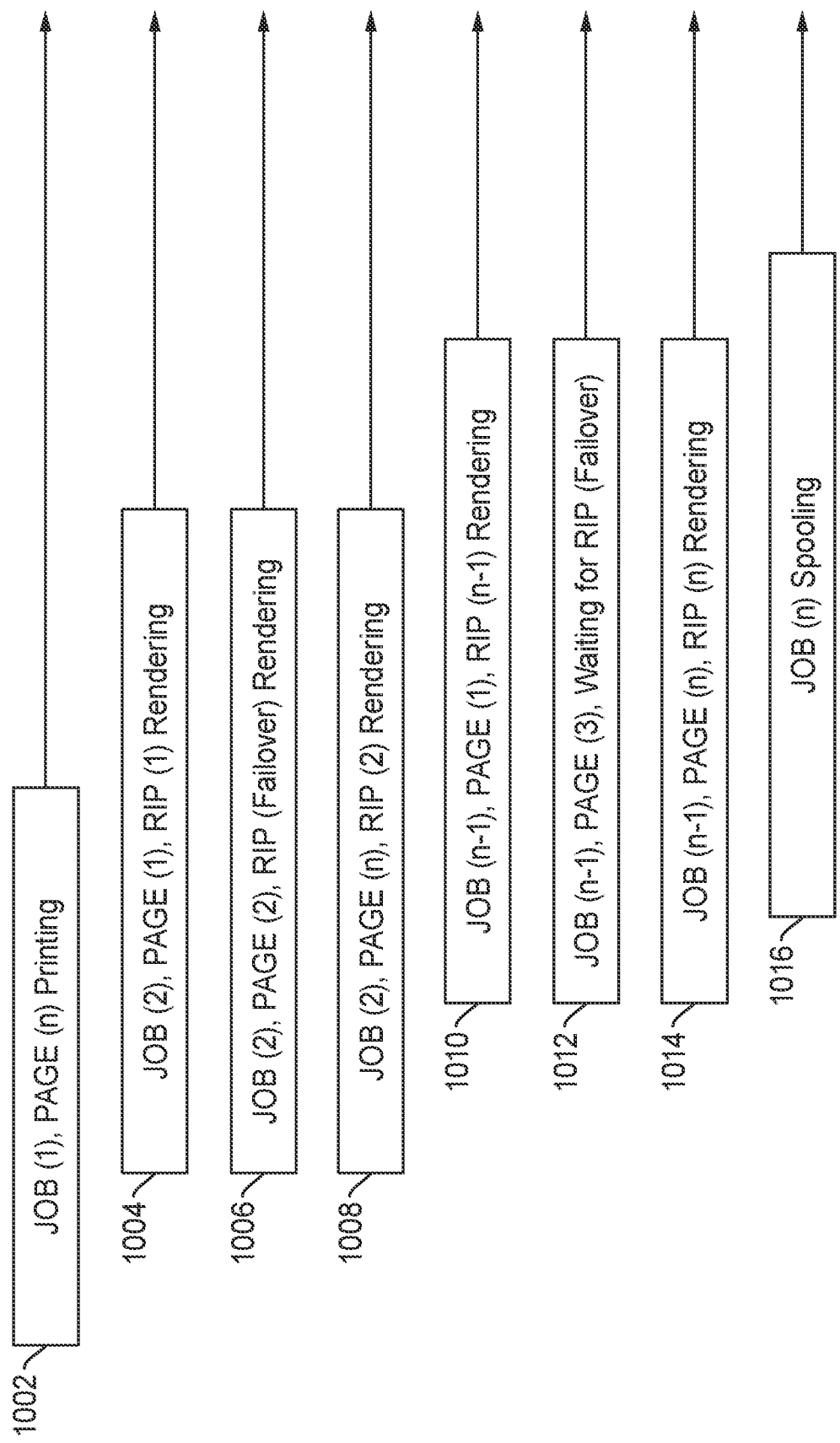
FIG. 10 illustrates a block diagram of parallel processing operations using the failover RIP within the RIP system according to the disclosed embodiments.

FIG. 10 depicts a block diagram of parallel processing operations using failover RIP 618 in RIP system 110 according to the disclosed embodiments. The block diagram shows the parallel processing of pages or segments as well as jobs within RIP system 110. RIP system 110 may process n jobs at one time. RIP instances are configured by front end 302 to process jobs as needed. The configuration is dynamic as the RIPs used to process a specific job may change. The RIPs themselves also may change.

Task 1002 shows job 1 being printed using print engine 260. Page n of job 1 is being printed. Front end 302 may provide the rendered output to print engine 260 to print each page of job 1. The RIPs of RIP system 110 already processed job 1.

Task 1004 shows RIP 1 processing page 1 of job 2 within RIP system 110. Job 2 is separate from job 1. Job 2 may be a PDF print job for a document. RIP 1 may be a high performance RIP configured to process the first pages of print jobs. Task 1006 shows a failover RIP processing page 2 of job 2. Due to an error in processing page 2 at a standard RIP, front end 302 may push page 2 to the failover RIP. The data for page 2 is different from page 1 in job 2. Task 1008 shows RIP 2 processing page n for job 2. RIP 2 may have initially processed page 2 of job 2 that is now being processed by the failover RIP. As a result, RIP 2 retrieves data for the next page of job 2 to be processed. Tasks 1004, 1006, and 1008 execute in parallel to process job 2 in parallel.

Task 1010 shows RIP n-1 processing page 1 of job n-1. Job n-1 may be received later in RIP system 100 than job 1 or job 2. Task 1012 shows page 3 for job n-1 being placed in the failover queue, waiting to be pulled by the failover RIP, which is rendering page 2 of job 2 in task 1006. Page 3 may be an error page. Task 1014 shows RIP n rendering page n of job n-1. Even though page 3 is not being rendered at this instance, RIP n retrieves another page to begin processing without waiting for page 3 to be rendered.

Task 1016 shows front end 302 spooling job n. Job n may be the most recent job received within RIP system 110. After spooling, front end 302 will determine what type of job is job n and configure the RIP instances accordingly. It should be noted that tasks 1002-1016 are executing in parallel. Further, jobs 1, 2, n-1 and n are being processed in parallel. Thus, RIP system 110 is able to process job in a dynamic and optimal manner that increases speed and capability within a production printing system.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for resolving an error during printing operations, the method comprising:
   detecting an error in processing a page of a print job by a first raster image processor (RIP) of a RIP system;
   activating a failover RIP by a front end of the RIP system;
   processing the page at the failover RIP, wherein the failover RIP is configured to process the page using a different strategy than the first RIP, wherein the different strategy for the failover RIP is using less memory than the first RIP;
   processing a next page of the print job at the first RIP; and
   outputting the processed page from the failover RIP to the front end.

2. The method of claim 1, further comprising outputting the next page from the first RIP to the front end.

3. The method of claim 1, further comprising configuring a standard RIP to be the failover RIP by the front end.

4. The method of claim 3, wherein the failover RIP is configured to have a lower number of renderers than the first RIP.

5. The method of claim 1, further comprising pushing the page to the failover RIP.

6. The method of claim 1, further comprising pulling the page by the failover RIP from a failover queue.

7. The method of claim 6, further comprising placing the page in the failover queue if the failover RIP is busy.

8. The method of claim 6, further comprising processing a previous page within the failover RIP prior to pulling another page from the failover queue.

9. The method of claim 1, further comprising reconfiguring the failover RIP to change a resource available to the failover RIP.

10. The method of claim 1, further comprising returning the error on the page by the failover RIP.

11. The method of claim 10, further comprising cancelling the print job.

12. A method for managing printing operations, the method comprising:
   detecting an error in processing a page of a print job by a first raster image processor (RTP) of a RIP system;
   determining whether a failover RTP is active within the RTP system;
   if the failover RIP is not active, configuring the failover RTP by a front end of the RIP system and pushing the page to the failover RIP;

if the failover RIP is active, placing the page in a failover queue, wherein the failover RTP pulls the page from the failover queue;

processing the page at the failover RTP;

determining that the failover RIP cannot render the page;

reconfiguring the failover RIP by the front end; and outputting the processed page from the failover RIP to the front end.

13. The method of claim 12, wherein reconfiguring the failover RIP includes modifying a resource within the failover RIP.

14. The method of claim 13, wherein the resource is a number of renderers for the failover RTP.

15. The method of claim 13, wherein the resource is memory allocated to the failover RTP.

16. The method of claim 13, wherein the resource includes additional fonts available to the failover RIP.

17. The method of claim 13, wherein the resource is decreasing a parallelism in the failover RIP.

18. A method for managing printing operations, the method comprising:

detecting an error in processing a page of a print job by a first raster image processor (RTP) of a RIP system;

assigning the page to a failover RTP within the RIP system;

partitioning the page into a plurality of bands, wherein each of the plurality of bands having a first band size;

processing each of the plurality of bands for the page at the failover RTP;

generating output for the page by the failover RTP; and forwarding the output to a front end of the RIP system.

19. The method of claim 18, further comprising determining that the failover RIP cannot process the plurality of bands for the page.

20. The method of claim 19, further comprising further partitioning the plurality of bands to having a second band size.

21. A method for resolving an error during printing operations, the method comprising:

detecting an error in processing a page of a print job by a first raster image processor (RTP) of a RIP system;

activating a failover RIP by a front end of the RTP system;

processing the page at the failover RTP, wherein the failover RIP is configured to process the page using a different strategy than the first RIP;

determining that the failover RIP cannot render the page successfully;

reconfiguring the failover RIP to change a resource available to the failover RTP;

processing a next page of the print job at the first RIP; and outputting the processed page from the failover RIP to the front end.

* * * * *